United States Patent
Khaldi (12) 
(10) Patent No.: US 6,500,555 B1
(45) Date of Patent: Dec. 31, 2002

(54) THERMOCHROMIC LAMINATES AND METHODS FOR CONTROLLING THE TEMPERATURE OF A STRUCTURE

(75) Inventor: Waleed Khaldi, Fairfax Station, VA (US)

(73) Assignee: Cygnet Works, Inc., Fairfax Station, VA (US)

( * ) Notice: Subject to any disclaimer, the term of this patent is extended or adjusted under 35 U.S.C. 154(b) by 0 days.

(21) Appl. No.: 09/807,863

(22) PCT Filed: Sep. 29, 2000

(86) PCT No.: PCT/US00/26795

§ 371 (c)(1),
(2), (4) Date: Jul. 6, 2001

(87) PCT Pub. No.: WO01/23173

PCT Pub. Date: Apr. 5, 2001

Related U.S. Application Data
(60) Provisional application No. 60/156,520, filed on Sep. 29, 1999.

(51) Int. Cl.[7] ................................................. B32B 15/04
(52) U.S. Cl. ........................................ 428/457; 430/275
(58) Field of Search .................................. 428/195, 457; 430/275

(56) References Cited

U.S. PATENT DOCUMENTS

| | | |
|---|---|---|
| 4,028,118 A | 6/1977 | Nakasuji et al. |
| 4,826,550 A | 5/1989 | Shimizu et al. |
| 5,352,649 A | 10/1994 | Shibahashi et al. |
| 5,558,700 A | 9/1996 | Shibahashi et al. |
| 5,585,425 A | 12/1996 | Kito et al. |
| 5,688,592 A | 11/1997 | Shibahashi et al. |
| 5,798,404 A | 8/1998 | Monty et al. |
| 5,805,245 A | 9/1998 | Davis |
| 5,919,404 A | 7/1999 | Fujita et al. |
| 6,084,702 A | 7/2000 | Byker et al. |

*Primary Examiner*—Elizabeth Evans
(74) *Attorney, Agent, or Firm*—Venable, Baetjer, Howard & Civiletti, LLP (57) ABSTRACT

Thermochromic laminates, which predictably vary their ability to absorb or reflect electromagnetic radiation, are provided. Laminates of the invention advantageously possess temperature trigger zones, that is, points or ranges of temperature, which function to decrease or increase the amount of electromagnetic energy, and particularly energy in the UV, infrared and visible ranges, that is reflected from the laminate, or absorbed as heat by the laminate and transmitted to an underlying structure. Laminates of the present invention can be provided in a variety of colors and temperature trigger points or ranges, and require no input of external energy except that of the impinging radiation. Laminates of the invention advantageously can be used in methods alone or combined with other materials such as roofing, siding, heat exchangers and other heat transfer materials and are therefore useful to control the temperature of an underlying structure or object.

36 Claims, 4 Drawing Sheets

THERMOCHROMIC LAMINATES AND METHODS FOR CONTROLLING THE TEMPERATURE OF A STRUCTURE

CROSS REFERENCE TO RELATED APPLICATION

This application claims the priority of U.S. Provisional Application No. 60/156,520, filed Sep. 29, 1999, which is incorporated herein by reference.

FIELD OF THE INVENTION

The present invention pertains to laminates which absorb or reflect electromagnetic radiation in a predictably variable manner and can thus be used to control the heat absorbed or directed away from an underlying structure. Laminates of the present invention comprise at least one thermochromic layer and at least one reflective layer and vary predictably with response to their properties of heat absorption and reflection. They are thus thermoabsorptive-reflective dynamic laminates useful, for example, in effecting methods for controlling the absorption or reflection of radiant or heat energy into or away from of structures that underlie the laminates.

BACKGROUND OF THE INVENTION

It is known that thermochromic compositions change color in response to temperature fluctuations. In their simplest form, thermochromic compositions are special combinations of chemical compounds and organic materials that exhibit color or transparency to light in response to temperature fluctuations. Typically, upon reaching or exceeding a trigger temperature, a thermochromic composition exhibits transparency to thermal or "UVI" radiation and, upon falling below a trigger temperature, the thermochromic material will exhibit color, and, correspondingly, opacity to radiant energy. The thermal or "UVI" radiation range is the range of frequencies in the Ultraviolet, Visible and Infrared ranges which produce heat in objects, which absorb those frequencies. The relative transparency/opacity of a thermochromic material is dynamic with respect to the trigger temperature or trigger temperature range of the specific thermochromic material. For example, a thermochromic material having a trigger temperature of precisely 72 degrees Fahrenheit would be opaque to light and thus would absorb thermal radiation in the UVI range at temperatures below 72 degrees Fahrenheit and transparent, or non-absorptive, to UVI light at temperatures above 72 degrees Fahrenheit.

Materials are known that possess the properties of color-exhibiting and color-extinguishing to a transparent state when exposed to temperature change above their trigger temperatures. Materials are known which can go through numerous cycles of changing between color-exhibition and color-extinguishing to transparency. Such materials are described, for example, in U.S. Pat. Nos. 5,919,404 and 5,558,700, which are incorporated herein by reference.

All patents cited herein are incorporated by reference.

It is known that modifying ratios of the compounds used to produce a thermochromic composition can control the trigger temperature and relative sensitivity of coloration/transparency of thermochromic materials. In addition, the maximum density of the color displayed when the thermochromic composition is in the color-exhibiting state can also be controlled to be either translucent (i.e. partially transparent) in varying degrees or to be fully opaque. For example, U.S. Pat. No. 5,585,425 describes a method for creating a thermochromic opaque/transparent composition, laminate member. Other patents relevant to methods for manipulating the properties of thermochromic materials are described in U.S. Pat. Nos. 4,028,118 and 5,919,404.

It is also known that thermochromic compositions can be produced in a range of different colors. For example, U.S. Pat. No. 5,919,404 describes a method for creating reversible thermochromic compositions that exhibit a wide range of traditional colors, while U.S. Pat. No. 5,558,700 describes a method for creating reversible thermochromic compositions that exhibit fluorescent colors. It is likewise known that thermochromic compositions can be laminated to various substrates depending on the desired application, i.e. U.S. Pat. Nos. 5,352,649 pertaining to a thermochromic laminate member, and composition and sheet for producing the same; U.S. Pat. No. 5,688,592 ("Shibahashi '592"); and U.S. Pat. No. 5,585,425.

In a more complex form, thermochromic compositions can be produced in the form of microcapsules using conventionally known methods to protect the material from external elements, maintain their functionality and to endow them with desirable properties and characteristics. U.S. Pat. Nos. 4,028,118 and 5,919,404 are good examples of patents that describe known properties of thermochromic compositions.

It is also known that thermochromic materials can be added to thermoplastics, polyvinyl chloride (PVC) or other resins and molded into any shape or design or made into sheets (as described in U.S. Pat. Nos. 4,826,550 and 5,919,404). For example, U.S. Pat. No. 5,798,404 describes a method in which hair curlers are manufactured with a thermochromic thermoplastic elastomer body.

Significant research has gone into increasing the light-fastness of the colors of thermochromic materials as perceived by the human eye, increasing luminosity (brightness) and reducing the fading of colors that may be caused by the cycling of sunlight, and especially by ultraviolet frequencies. The purpose of such research is to develop formulations of thermochromic materials that are more resistant to damage from light, which impinges upon them. The Shibahashi '592 patent describes an example of a layer of thermochromic material (blue in color) which was covered with a UV filter layer, which is dark yellow in color. When the thermochromic material was in the color developed stage, the additive color rule applies, that is, yellow+blue=green. Therefore the perceived color of the material in its color-developed stage is green and not blue. A solution to this problem presented in the Shibahashi '592 patent is to combine two layers the first of which is a color reflecting layer comprising particulates of natural mica coated with a reflective metallic luster pigment such as titanium oxide sprinkled on the layer. An additional feature is to provide, over the thermochromic layer, a layer of UV absorber, which filters out UV light. One of the functions of the reflective layer is to reflect some of the light before it hits the UV absorber and the thermochromic layer to thereby present the true color of the underlying layer. The Shibahashi '592 patent does not, however, recognize the advantages of utilizing the variable transmissivity of thermochromic materials to control the thermal absorption or reflectance of a structure.

SUMMARY AND OBJECTS OF THE INVENTION

Thermochromic laminates of the present invention, and methods for using them, comprise a passive system that automatically varies the reflection or absorption of electromagnetic energy in response to temperature changes. Thus, the present laminates function with respect to predetermined temperature trigger points or ranges without the input of energy except from that of the incident radiation. Laminates of the invention comprise at least two layers, a thermochromic layer having a trigger temperature or a trigger temperature range, and a reflective, or partially reflective layer that is concealed from or exposed to radiant energy incident upon the outer laminate by the change in transmissivity and corresponding color change of the thermochromic layer. The interaction of the at least two layers with respect to the absorption or reflection of radiant or thermal energy can be used to control or modulate the absorption of heat or other energy by an underlying structure. By doing so, the present invention diminishes the need for the use of conventional energy sources such as electricity or natural gas to control the temperature of the underlying structure. Further objectives and advantages will become apparent from a consideration of the following description and attached drawings.

It is an object of the present invention to provide thermochromic laminates that can be utilized to control the heat gain or loss of an underlying structure without the necessity for an external power source.

It is a similar object of the present invention to provide thermochromic laminates that predictably vary their absorption or reflectance of incident radiant energy in response to temperature changes.

It is also an object of the present invention to provide thermochromic laminates that predictably effect color changes in response to changes in temperature. Yet an additional object of the present invention is to provide methods for using thermochromic laminates to regulate the thermal energy absorption or reflection of a structure to thereby control its temperature.

In accordance with this and other objects of the invention, a thermochromic laminate is provided comprising a base layer, the base layer having a structure contacting surface for communicating with an underlying structure such as an airplane hanger, an automobile, a house or other building, and a thermochromic contacting surface for communicating with the thermochromic layer of the laminate. The base layer is both substantially reflective to electromagnetic radiation and substantially conductive to heat. Laminates of the present invention also comprise a thermochromic layer, the thermochromic layer having a base layer contacting surface for communicating with the base layer and an outer surface for communicating with electromagnetic radiation, for example from the sun. The thermochromic layer is of variable transmissivity to the electromagnetic radiation, the extent of the transmissivity being determined by the temperature of the thermochromic layer relative to its trigger point such that a change in the temperature results in a change in the transmissivity of the thermochromic layer and a change in the rate of heat transferred to, or reflected from, the underlying structure.

With laminates of the present invention, an increase in the temperature of the thermochromic layer above the trigger point or zone results in a color change to a more transparent state corresponding to an increase in the transmissivity of the thermochromic layer so that the amount of electromagnetic radiation reflected from the base layer through the thermochromic layer and away from the underlying structure is increased and the amount of heat available for absorption by the base layer is thereby decreased. Similarly, a decrease in the temperature of the thermochromic layer below the trigger point or zone results in a color change to a less transparent, or more opaque or colored state corresponding to decrease in the transmissivity of the thermochromic layer so that the amount of electromagnetic radiation reflected from the base layer through the thermochromic layer and away from the underlying structure is decreased and the amount of heat available for absorption by the base layer is thereby increased. Thus, the thermochromic layer of laminates of the present invention functions to vary predictably the accessibility of the reflective base layer to electromagnetic radiation. Thus, the more accessible the reflective layer becomes, the greater the proportion of the incident radiation that will be reflected away from the structure. The converse is true also.

Laminates of the invention can go through numerous temperature change cycles and still retain their advantageous features. The increase in the transmissivity of a thermochromic laminate of the present invention is reversible when the temperature decreases below a particular temperature trigger zone for the laminate. Similarly, the decrease in transmissivity of a thermochromic laminate is reversible when the temperature increases above the particular temperature trigger zone for the laminate. Typically, an increase or decrease in the transmissivity of the present thermochromic laminates is accompanied by a change in the opacity, color or both, of the thermochromic layer.

The base layer of the present laminate is typically metallic in nature, for example, comprising a metal such as aluminum having the ability to reflect sunlight and conduct heat. In some cases, a metallic coating on the underlying structure, or on an underlying heat-conductive fabric, will be sufficient to provide the reflective and heat-conductive and heat-emissive requirements of the base layer. Base layers of the present invention are not limited to metals, however. Any material that is both reflective and sufficiently heat-conductive to carry out the functions of the base layer can be used to form laminates of the present invention. Mylar is suitable for certain embodiments of the present invention.

In some embodiments, laminates of the present invention are attached to an underlying structure, such as the roof and exterior walls of a building, to the exterior surfaces of a greenhouse, or to the exterior surfaces of a desert shelter. Advantageously, the emissivity of the base layer can be matched to the specific environment in which the underlying structure exists. For example, in some applications, it may be desirable to use a thicker aluminum sheet as a base layer in order to delay the time required for incident radiation to be conducted into the underlying structure.

Laminates of the present invention are particularly useful in applications where the electromagnetic radiation impinging upon them is sunlight. Other forms of radiation, such as from artificial sources such as heat lamps or kiln fires, would also serve to operate the present laminates. An important characteristic of the laminates of the present invention is that they are passive in nature, that is, they require no external energy source other than that of the impinging radiant energy.

Another significant aspect of laminates of the present invention pertains to their temperature trigger zone, that is, a narrow temperature range in which occurs the transition of the thermochromic layer from being highly transmissive to electromagnetic energy such as sunlight, to being highly opaque, or from being highly opaque to being highly transmissive. The present laminates can be made to have a set temperature trigger zone around a specific trigger temperature point. The trigger zone might therefore be several degrees C. or less than one degree C. For example, a laminate might be set to be highly transmissive, that is, transparent or nearly transparent to visible, UV and infrared light at a temperature above 25 degrees C., and colored or opaque at temperature below 22 degrees C. Thus, the temperature trigger zone would be from 22 to 25 degrees C. Within the trigger zone, the degree of transmissivity/opacity/color would vary depending upon the particular laminate. Laminates of the present invention can be made to have wider or narrower temperature trigger zones as desired, and the trigger zones can be set at desired high and low temperature points.

Laminates of the present invention can be formed of materials that can be molded to fit the shapes of surfaces of the underlying structure, in forms sufficiently malleable to conform to irregular surfaces, for example, in a sheet like form sufficiently flexible to be wrapped over or around objects. Laminates of the present invention can also be combined with or incorporated into currently available materials that are used to build or cover underlying structures, for example, as the outside layer of vinyl siding materials. Laminates of the present invention can be made, for example, of a thermochromic layer that comprises at least one electron-donating phenolic compound, and that is enclosed in microcapsules. Moreover, the thermochromic layers of the present laminates can be provided in colors, which are coordinated to the esthetic appearance of the underlying structure, or to the local environment. Preferably, the thermochromic layer is provided in a color that optimizes the amount of thermal energy absorptivity in a given application of the laminate.

BRIEF DESCRIPTION OF THE DRAWINGS

The invention is better understood by reading the following detailed description with reference to the accompanying figures, in which like reference symbols refer to like elements throughout, and in which.

DESCRIPTION OF THE PREFERRED EMBODIMENTS

In describing preferred embodiments of the present invention illustrated in the drawings, specific terminology is employed for the sake of clarity. However, the invention is not intended to be limited to the specific terminology so selected. It is to be understood that each specific element includes all technical equivalents, which operate in a similar manner to accomplish a similar purpose. Each reference cited herein is incorporated by reference as if each were individually incorporated by reference.

The term "a" is intended to mean at least one unless the context indicates otherwise.

The "ambient temperature" refers to the temperature of the air surrounding the laminates.

The "trigger temperature" of the thermochromic material refers to the temperature point or range at which the material itself reaches a certain predetermined point or range ("trigger zone"). On a particularly warm day (say 90 degrees F.), the temperature of the shingles on a traditional shingle rooftop would reach between 150 and 170 degrees F. Thus, if direct sunlight is hitting the thermochromic outer layer of the laminate, the temperature of the thermochromic layer would reach its trigger zone much faster then the ambient temperature of the surrounding air would imply.

The trigger zone setting for the thermochromic layer is the point or range at which the thermochromic material changes from the color-developed mode to the color-extinguished mode to, or the reverse to thus either reveal or hide the reflective or base layer. The trigger zone for the present thermochromic material can be customized to change at many different specific temperature ranges. This capability permits the selection of a different trigger point or zone for different regions in the country. For example, a region where temperatures are generally warmer might require a lower trigger zone since it is desirable to maximize the reflectivity phase of the laminate versus the heat absorptivity phase. Other geographic regions where temperatures tend to be cooler would require a higher trigger zone setting in order to increase the heat absorptivity phase of the laminate when compared with the reflectivity phase.

The desirable trigger zone for the thermochromic layer would be determined based on many factors including average temperature, average sunshine rate, average comfort level temperature and rainfall, for example.

In relation to "color change," it is desirable that when the ambient temperature rises past the trigger zone, the thermochromic layer changes colors from the color-developed mode (opaque) to the color-extinguished mode (transparent) as quickly as possible. Just as important is the rapid color change from the color-extinguished mode to the color-developed mode as the temperature falls below the trigger zone. With some embodiments of the present laminates, most of the thermochromic materials tested changed colors quite rapidly, usually in less then 5 minutes upon reaching the lower end of the trigger zone.

The properties of relevant materials are significant to a description of the present invention. "Opacity" refers to the quality or degree of being impenetrable to light or radiation.

In optics, it refers to the ratio of the light flux incident on a surface to the light flux transmitted by the surface, which is equivalent to the reciprocal of the transmission factor. In physics, it refers to the ability of a substance to block radiation, as measured by the radiation flux incident on its surface. In electromagnetism, it refers to the ratio of electromagnetic power reflected from an object to that which is incident on the object.

For the present invention, it is desirable that when the thermochromic layer is in the color-developed mode, that the layer achieves a high rate of opacity to radiant energy. A high level of opacity ensures that the maximum amount of radiant energy hitting the thermochromic layer is converted into heat. It also ensures that the reflective layer is sufficiently covered so that radiant energy is not reflected back into the atmosphere.

"Translucent" pertains to materials having the property of partly reflecting and partly transmitting incident radiation.

The term "transparent" refers to having the property to allow radiation or particles to pass through with little interference. Transparent materials transmit most of the radiation that impinges upon them. For the present invention, it is desirable that when the thermochromic layer is in the color-extinguished mode, that the layer achieve a high rate of transparency to radiant energy. A high level of transparency ensures that a maximum amount of radiant energy passing through the thermochromic layer gets reflected back into the atmosphere by the reflective layer.

"Reflectivity" is the ability of a material to reflect thermal radiation (heat energy). In physics, it refers to the ratio of energies of the reflected wave to that of the incident wave; the portion of incident radiation reflected by a surface of discontinuity. In the present invention, it is important that the reflective or base layer efficiently reflect radiant energy. Most metals have good reflectivity properties and reflect most radiant energy. For the present invention, high reflectivity confers dual advantages:

1) during the warmer months, it is desirable to reflect radiant energy away from the underlying structure covered by the laminate; and
2) during the cooler months, when heat is generated within the structure (via a home heating unit for example), it is desirable to reflect back into the structure radiant energy generated from within the structure.

The present thermochromic laminates take advantage of this property at certain times of the day and at certain times of the year. When the ambient temperature rises over the trigger zone, the reflective layer is revealed thus reflecting radiant energy. When the ambient temperature falls below the trigger zone, the thermochromic layer hides the reflective layer thus minimizing the ability to reflect radiant energy back into the atmosphere and maximizing the absorption of heat. Methods of the present invention thus include the use of laminates of the invention to regulate the temperature of an underlying structure or object.

"Solar Reflectance" is the fraction of the incident solar energy that is reflected by the surface in question. It is a ration of energies of the reflected wave to that of the incident wave. Therefore, a reflectance of 0.8 equals a reflectance of 80% of the incident wave. In general it is either quoted as that ratio or converted into a percentage.

The best standard technique for determining reflectivity uses spectrophotometric measurements, with an integrating sphere to determine the reflectance at each different wavelength. An averaging process, which uses a standard solar spectrum, determines the average reflectance. This method is documented by ASTM (American Society for Testing and Materials) as Standards E903 and E892.

"Albedo" is another Term for Reflectance.

"Absorption" is the process by which radiant energy is absorbed and converted into other forms of energy such as heat. Absorption takes place only after the radiant flux enters a medium and thus acts only on the entering flux and not on the incident flux, some of which may be reflected at the surface of the medium. A substance, which absorbs energy, may also be a medium of refraction, diffraction, or scattering; these processes, however, involve no energy retention or transformation and are to be clearly differentiated from absorption.

"Absorptivity" in thermodynamics refers to the ratio of energy absorbed by a body to energy incident upon the same body. Absorptivity is usually denoted by the Greek letter alpha and lies between zero and unity for a real body. In many practical applications, to simplify the analysis, absorptivity is assumed to equal emissivity, usually represented by the Greek letter epsilon, although they are generally different for each body.

In relation to this invention, thermochromic materials can come in many different colors. In order to get the maximum benefit from this laminate, a dark color with a high absorptivity rate would be recommended (such as black, or dark brown). In this manner, when the laminate is in the heat absorbing phase, it is gaining as quickly and as much heat as possible. Dark colors with different tints may also be used with the laminate for aesthetic considerations, but will affect the total performance of the laminate since it could reduce the absorptivity rate.

It is a desirable property of laminates of the present invention that when the thermochromic laminate temperature is below a trigger zone, the laminate absorbs heat and conducts it into the underlying structure it covers to thereby heat the structure. In addition, the thermochromic laminates of the present invention change their absorptivity rate when the laminate temperature reaches a pre-determined trigger zone. The laminate is in its color-developed (heat absorptive) mode when the temperature is below the trigger zone. In a typical embodiment, the present laminate in its color-developed mode is a dark opaque color, which maximizes the absorption rate. Above the pre-determined trigger zone, the laminate becomes transparent or translucent which dramatically reduces the absorptivity rate and reveals the reflective layer.

"Heat conductivity" is the ability of a material to transfer heat from one side to another. It is important that the lower reflective layer easily conduct heat into the structure when the laminate temperature is below the trigger zone. When coupled with the color-developed thermochromic layer (maximum absorptivity), it is desirable that the heat generated at the thermochromic layer be easily transferred into the structure covered by the thermochromic laminate. This is also a desirable property, particularly in transferring heat out of the structure when there is an excess of heat in the structure being covered by the laminate, i.e. in an attic. An advantage of this characteristic can be demonstrated for example when at the end of a very hot day, the attic of a house would have an excess amount of heat stored in it. Heated air in the attic transfers heat to the roof via convection, which then transfers it out to the reflective layer via conduction. This is when the heat transferred to the reflective layer needs to be transferred and released out of the structure.

Metals are very good conductors of heat because they contain large numbers of electrons that are relatively free to move through the metal and can transport energy from one region to another. Materials such as asbestos, cork, paper, and fiberglass are poor conductors of heat. In embodiments of the present invention utilizing metallic base layers, this property of metals is advantageous. For example, when the outside temperature is below the trigger zone, heat absorbed through the color-developed thermochromic layer gets transferred to the reflective aluminum layer through conduction, which then transfers the heat to the structure.

In general, "conduction" is direct heat flow through matter (molecular motion). It results from actual physical contact of one part of the same body with another part, or of one body with another. For instance, if one end of an iron rod is heated, the heat travels by conduction through the metal to the other end; it also travels to the surface and is conducted to the surrounding air which is another, but less dense, body. An example of conduction through contact between two solids is a cooking pot on the solid surface of a hot stove. The greatest flow of heat possible between materials is where there is direct conduction between solids. Heat is always conducted from warm to cold; never from cold to warm, and always moves via the shortest and easiest route. In general, the more dense a substance, the better conductor it is. Solid rock, glass, and aluminum, being very dense are good conductors of heat. Reduce their density by mixing air into the mass, and their conductivity is reduced.

"Convection" is the transport of heat within a gas or liquid, caused by the actual flow of material itself (mass motion). In building spaces, natural convection heat flow is largely upward, somewhat sideways, not downwards. This is called "free convection". For instance, a warm stove, person, floor, wall, etc., loses heat by conduction to the cooler air in contact with it. This added heat activates (warms) the molecules of the air which expand, becoming less dense, and rise. Cooler, heavier air rushes in from the side and below to replace it. The popular expression "hot air rises" is exemplified by smoke rising from a chimney or cigarette. The motion is turbulently upward, with a component of sideways motion. Convection may also be mechanically induced as by a fan. This is called "forced convection".

"Emissivity" is the rate at which radiation is given off or emitted. Absorption of radiation of an object is proportional to the absorptivity factor of its surface, which is reciprocal of its emissivity. In thermodynamics, it refers to the ratio of the radiation emitted by a body to the radiation that would be produced by a perfect blackbody radiator of the same temperature in the same environment. Emissivity is usually denoted by the Greek letter ($\epsilon$) and, for real bodies, is less than unity.

Although two objects may be identical, if the surface of one were covered with a material of 90% emissivity, and the surface of the other with a material of 5% emissivity, there would result a drastic difference in the rate of radiation flow from these two objects. This is demonstrated by comparison of four identical, equally heated iron radiators covered with different materials. Paint one with aluminum paint and another with ordinary enamel. Cover the third with asbestos and the fourth with aluminum foil. Although all have the same initial temperature, the one covered with aluminum foil would radiate the least, for instance, at a rate of about 5% emissivity. The radiators covered with ordinary paint or asbestos would radiate most, because they have the highest emissivity, (even higher than ordinary iron). Painting over the aluminum paint or foil with ordinary paint changes the surface to 90% emissivity.

Materials whose surfaces do not appreciably reflect infrared rays, for example, paper, asphalt, wood, glass and rock, have absorption and emissivity rates ranging from 80% to 93%. Most materials used in building construction such as brick, stone, paper, and so on regardless of their color, absorb infrared radiation at about 90%. It is interesting to note that a mirror is glass is an excellent reflector of light but a poor reflector of infrared radiation. Mirrors have about the same reflectivity for infrared as a coating of black paint.

The ability of a material to transmit radiant energy at certain times of the day and certain times of the year is a desirable property. When the laminate temperature is above a trigger zone, it is desirable that the material has a low emissivity rate that translates into a reduced transmission of radiant energy into the structure covered by the reflective layer.

Nevertheless, low emissivity is not always a desired property. If there is excess stored heat in a structure (i.e. an attic) it is desirable that the emissivity be high in order to release the extra energy stored within the structure. Fortunately, even low emissivity materials such as Aluminum foil (which has many other desirable properties) can be used since the fact is that the thermochromic layer is highly emissive and when covering the Aluminum layer will work to raise the emissivity of the Aluminum foil.

"Infrared Emittance" is a parameter between 0 and 1 which measures the ability of a warm or hot material to shed some of its heat in the form of infrared radiation. The wavelength range for this radiant energy is roughly 5 to 40 micrometers. Most building materials, including glass, are opaque in this part of the spectrum, and have an emittance of roughly 0.9. Materials such as clean, bare metals are the most important exceptions to the 0.9 rule. Thus clean, untarnished galvanized steel has a very low emittance, and aluminum roof coatings have intermediate levels of emittance. A material with an emittance of unity ("black body") emits about 6.1 watts per square meter, for each degree C. above ambient temperature.

In general, "radiation" is the transmission of electromagnetic rays through space. Radiation, like radio waves, is invisible. Each material whose temperature is above absolute zero emits radiant energy, including the sun, icebergs, stoves or radiators, humans, animals, furniture, ceilings, walls, floors, etc. Radiant energy radiates from these objects in all directions, in a straight line, until the radiation is reflected or absorbed by another object. Traveling at the speed of light, these rays are invisible, and they have no temperature, only energy. When radiant energy strikes the surface of another object, the rays are absorbed, and only then is heat produced in the object. This heat spreads throughout the mass by conduction.

"Radiant Energy" is the energy transported by electromagnetic radiation. When this radiation is absorbed by an object in its path, then it may get absorbed partly or completely and transformed into some other form. For example, this is the case with the microwave radiation (electromagnetic ration near ca. 5 GHz) when it is absorbed by the water in food, and transformed into thermal heat.

"Radiant heating" is the rate at which radiation (emission) is given off. Absorption of radiation of an object is proportional to the absorptivity factor of its surface, which is reciprocal of its emissivity.

Figure 1A:
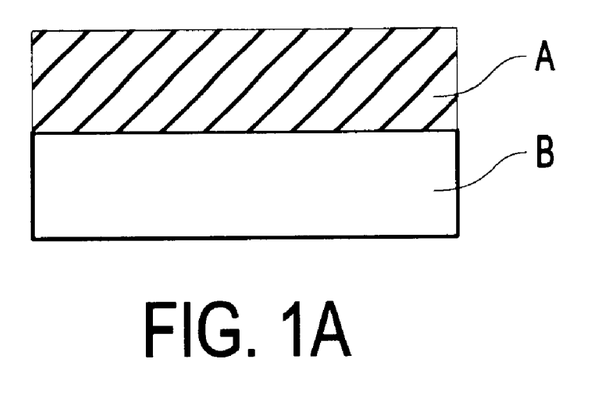
FIG. 1A shows a cross-sectional view of a laminate according to the present invention having a base layer A of reflective material, such as aluminum foil, and a thermochromic layer B of thermochromic material.
Figure 1B:
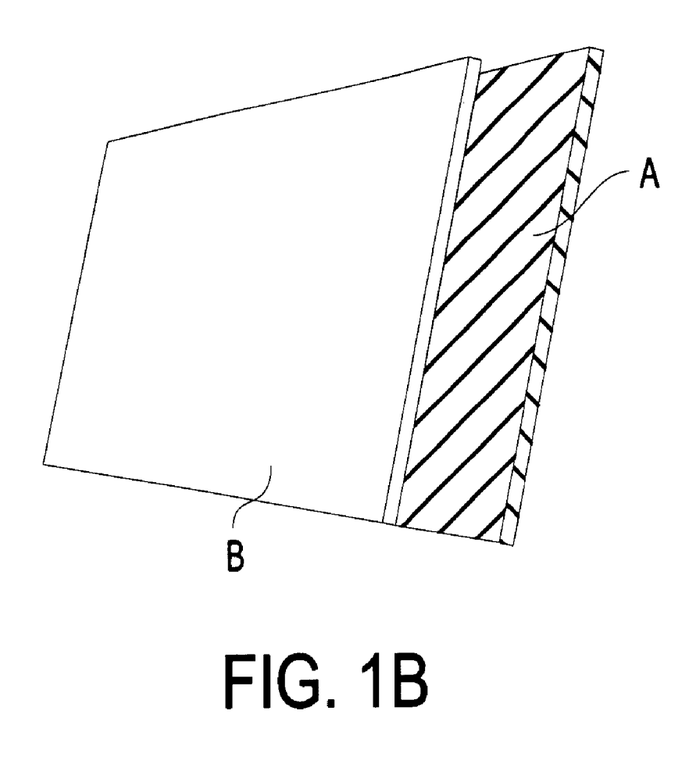
FIG. 1B shows an oblique view of the same laminate according to the invention shown in FIG. 1A.
Figure 2A:
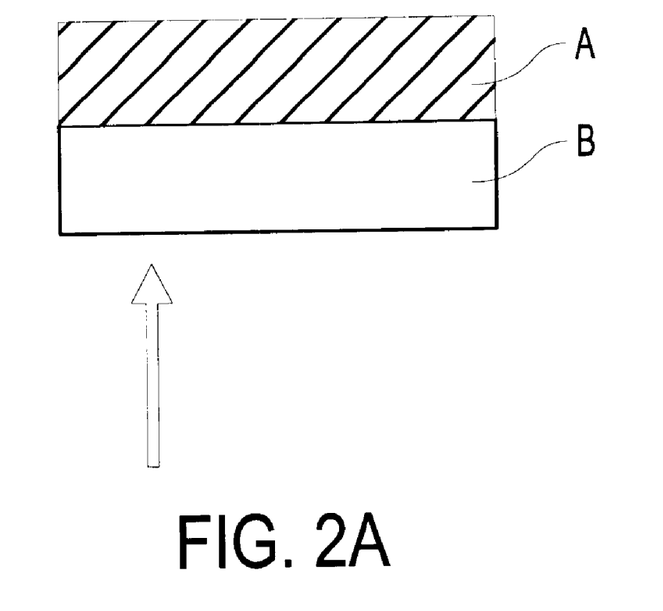
FIG. 2A shows a cross-sectional view of a laminate according to the present invention having a base layer A of reflective material, such as aluminum foil, and a thermochromic layer B of thermochromic material in an opaque state due to the fact that the laminate is below its trigger temperature. The reflective layer remains unchanged. Because layer B is below its trigger temperature and thus opaque, layer A does not reflect thermal radiation which therefore strikes, and is absorbed by, thermochromic layer B. Thus, both layers B and A will increase in temperature, and heat is passed to the structure underlying them.
Figure 2B:
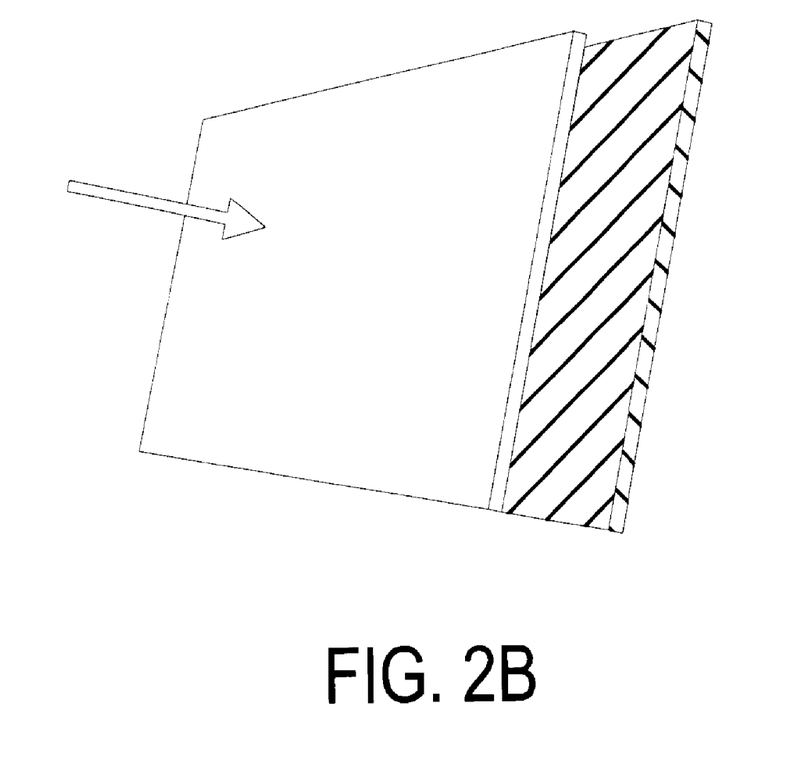
FIG. 2B shows an oblique view of the same laminate according to the invention shown in FIG. 2A.
Figure 3A:
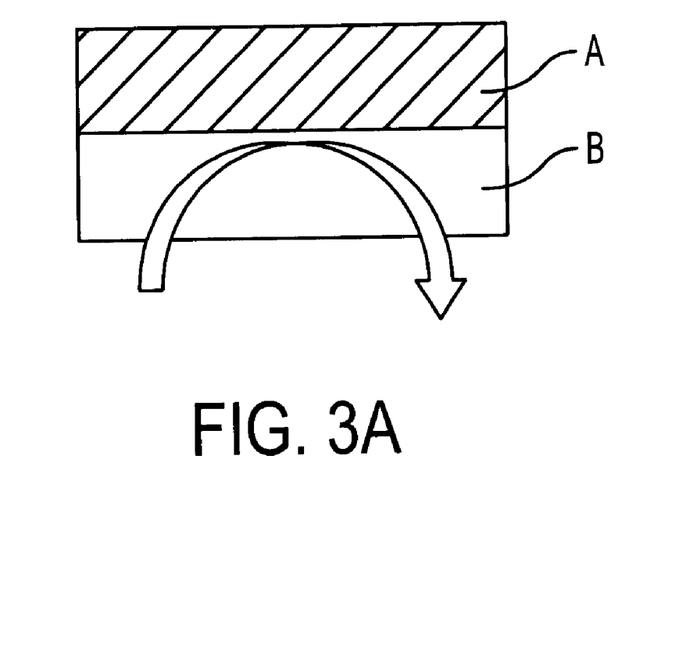
FIG. 3A shows a cross-sectional view of a laminate according to the present invention having a base layer A of reflective material such as aluminum foil and a thermochromic layer B of thermochromic material in a transparent (or clear) state due to the fact that the laminate is above its trigger temperature. The reflective layer remains unchanged. However, because layer B is transparent (or clear), layer A reflects thermal radiation, which passes through, and is thus not absorbed by thermochromic layer B. Thus, both layers A and B will not increase in temperature, and the structure underlying them will not absorb heat from the incident thermal radiation.
Figure 3B:
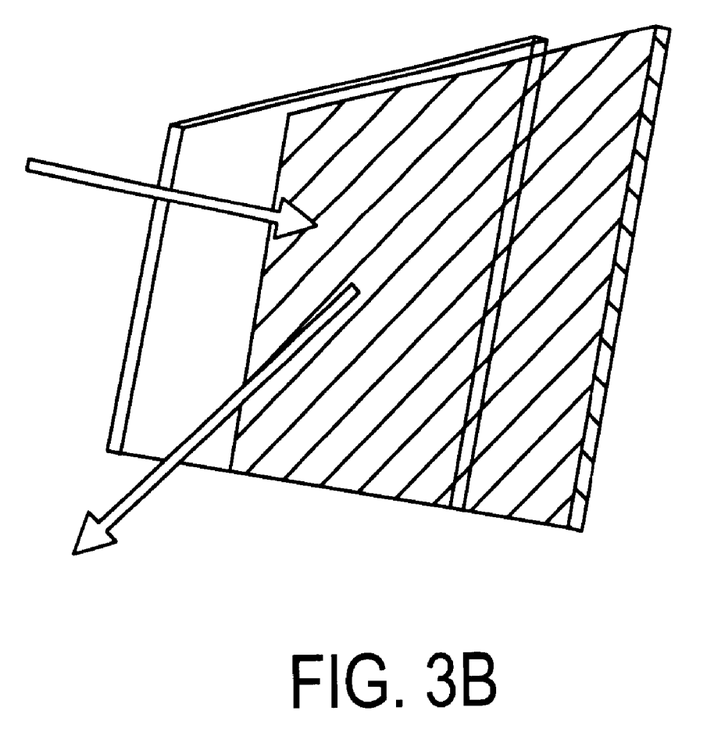
FIG. 3B shows an oblique view of the same laminate according to the invention shown in FIG. 3A.
Figure 4:
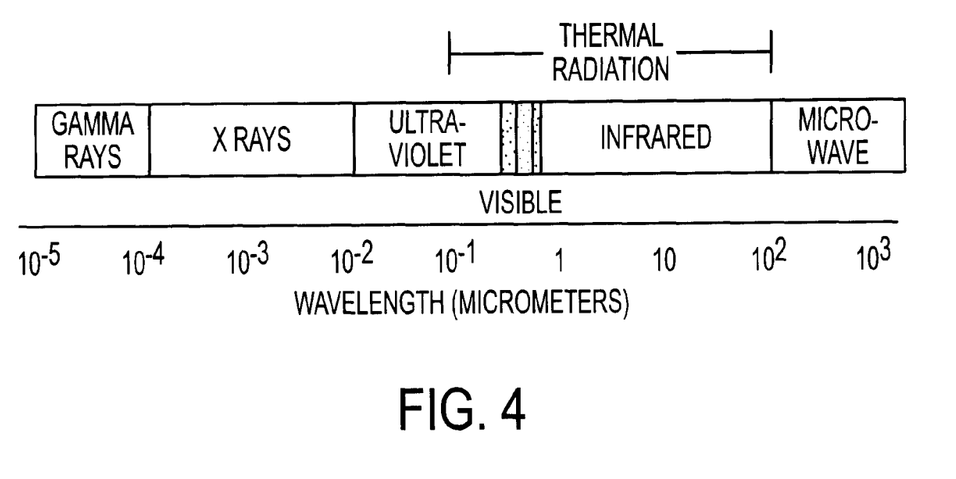
FIG. 4 shows the approximate ranges of thermal radiation that are susceptible to laminates of the present invention.

Until the present invention, thermochromic materials that can be used in combination with other materials to create a dynamic yet passive system of heat absorption and reflection were unknown. As is shown in FIGS. 1–7, laminates according to the present invention can be utilized to help control the temperature of underlying structures such as buildings, vehicles and earthen surfaces.

The following Table illustrates key aspects of the invention.

TABLE 1

| Temperature | Thermochromic Layer | Reflective Layer (i.e. Aluminum Foil) | Thermochromic Laminate Status | Result |
|---|---|---|---|---|
| Below Trigger Zone | Opaque | Not Visible | Absorptive | Radiant energy is intercepted by the thermochromic layer and converted into heat. Heat then is transferred to the reflective layer via conduction, which is again transferred to the structure via radiation, and conduction. |
| Above Trigger Zone | Transparent | Visible | Reflective | Radiant energy passes through the transparent thermochromic layer and is reflected back into the atmosphere by the reflective layer. |

Additional advantages of the present invention are that the laminates are light in weight, thereby reducing roof-load support requirements, and their use may reduce the cooling load sufficiently to allow installation of a smaller capacity air-conditioning systems.

The use of different shingles may yield various results. The energy intensity of the solar spectrum (W/m$^2$ nm) is highest in the visible range and some 60% of overall solar energy content is contained in this frequency range.

TABLE 2

According to Florida Solar Energy Center FSEC-CR-670-93

| | | | Reflectance % | | |
|---|---|---|---|---|---|
| Shingle Color/ Material | Solar Reflectance | Ultraviolet Reflectance | Visible Reflectance | Near Infrared Reflectance | Far Infrared Emittance |
| Aluminum | 71.3 | 75.0 | 74.0 | 68.7 | 0.04 |
| Generic Black | 5.0 | 4.6 | 5.3 | 4.8 | 0.91 |

Table 2 shows that a Black shingle has very low reflectance to all bands of solar energy. A black shingle does however, have a high emittance, that is emits heat that it has absorbed quite well. In contrast, an aluminum shingle has excellent reflectance to solar energy but has a very low emittance factor, that is, emits heat poorly.

According to Florida Solar Energy Center Study # FSEC-CR-670-93 low emissivity of Aluminum would compromise its performance in applications for roofing and siding material. This occurs when, over the time of daily solar cycling, the structure gains heat energy and, because of the low emissivity of aluminum, the heat stays trapped within the structure for a much longer period of time than with other materials.

The present thermochromic laminates advantageously increases the emissivity of aluminum. Because the thermochromic layer is positioned above the reflective aluminum layer, when in color-developed mode, the thermochromic layer raises the emissivity of the aluminum layer allowing it to release the trapped heat.

In sum, laminates of the present invention:
1) gain less heat then standard shingles during summer and thereby keep the underlying structure cooler;
2) retain more heat then shingles during winter due to the reflective layer of the present laminates which reflects radiant energy back into the structure;
3) gain more heat during winter then a roof that is reflective only;
4) gain less heat during summer then thermochromic material alone; and
5) have greater emissivity then metallic foils or aluminum sheeting alone.

Aluminum foil is one desirable material for use as the reflective layer of the present thermochromic laminates. Aluminum is an efficient reflector of radiant energy and is readily available and easily recyclable. In addition aluminum is a low emissivity material.

In general, low emissivity is both a blessing and a curse. Low emissivity is very desirable with respect to heat dissipation. However, when heat has built up in a structure, low emissivity hampers the release of excess heat. Thus, although aluminum is not widely regarded as the desirable material for a reflective roof due to its very low emissivity, when coupled with a thermochromic layer in the color developed mode as in the present invention, its emissivity is raised to closely match that of the black shingle.

In yet another aspect of the present invention, when thermal energy from the sun heats a roof, most of the heat will conduct through the exterior roofing materials to the inside surface of the roof sheathing. This heat then transfers by radiation across the attic space to the next material, either the top of the attic insulation or the attic floor. A radiant barrier, properly installed in one of the many locations between the roof surface and the attic floor, will significantly reduce radiant heat flow.

A radiant barrier reduces heat transfer. Heat travels from a warm area to a cool area by conduction, convection and radiation. Heat flows by conduction from a hotter material to a colder material when the two materials are in direct physical contact. Heat transfer by natural convection occurs when a liquid or gas is heated, becomes less dense, and rises. Thermal radiation, or radiant heat, travels in a straight line away from a hot surface and heats any object in its path that absorbs its energy.

Using radiant barriers to reduce space heating losses has had mixed test results, however in some cases, the use of a radiant barrier has increased heating costs by not utilizing the advantage of the winter solar gain. Radiant barriers tend to offer a much lower potential for energy savings in colder climates. If you live in a cold climate, installing a radiant barrier is not generally recommended. Radiant barriers are most effective in blocking summer radiant heat gain and saving air-conditioning costs. In cold climates, air-conditioning is usually a much lower priority than heating. Although the radiant barrier may be somewhat effective in retaining heat within a home, it may also block any winter radiant solar heat gain in the attic. (Source: Energy Efficiency and Renewable Energy Network (EREN)—U.S. Dept. of Energy Consumer Energy Information: EREC Reference Briefs—Radiant Barriers). Generally, the present invention takes advantage of the phenomena that during winter the source of energy to heat a structure comes from an energy-consuming furnace or heat pump within the structure, and during summer, the heat is thermal energy from the sun.

When placed over an underlying structure or surface, laminates of the present invention can be used to both protect those structures or surfaces from damage caused by incident thermal energy, and to control the temperature of the underlying structure without the need for electricity, electronic or electrical controls, motors or positioning apparatus thus saving energy and expense One potential use of the passive yet dynamic laminates of the present invention is that they can be utilized in the manufacture of roofing materials or other materials used on surfaces, which are exposed to sunlight or other forms of thermal radiation. For example, in one embodiment, the presently disclosed laminate systems can be set to trigger (or switch from energy-absorbing to energy-reflecting modes, or the reverse) at 72 F.°. When the ambient temperature rises above the predetermined trigger temperature of 72 F.°, the thermochromic layer will then revert to the transparent state thus revealing the reflective material. At this point, the reflective material will start to reflect the sunlight (the source of heat/thermal radiation in this example) thus minimizing the amount of heat that is absorbed through the roof. In the opposite phase, when the ambient temperature falls below 72 F.°, the thermochromic layer changes into its opaque/color-exhibiting state, which in effect hides the reflective material and converts much of the sunlight into heat energy. Choosing a thermochromic layer, which changes to a very low reflectivity color such as black, maximizes the heat absorption rate. Heat is then transferred to the underlying structure by way of conduction.

The thermochromic layer will be optimized to give the maximum amount of opacity to all wavelengths of thermal radiation. In addition, the reflective layer can be selected so as to give the maximum desired reflectivity while the thermochromic layer is in the transparent state and the maximum desired heat conductivity while in the opaque/color-exhibiting state.

EXAMPLES

Model Building and Preparation

Two miniature roof models were created for testing purposes. The models where created using standard roofing wood (½ inch thickness). The sides of the roof measured approximately 1 ft.×1 ft. each. All the seams were then sealed and attached to a flat wood base. One of the roof sides was then slit to allow the insertion of a temperature probe. The slit was then patched with insulating material to keep the inner roof chamber sealed. Commercially available Owens Corning Classic Shingles (Asphalt FiberGlas®—Onyx Black) were attached to the first model which is considered the base. The second model was used to test different combinations of materials against the standard shingle roof model.

Heat Source

In most performance tests, the models were placed outside in an open area. In other performance tests, two 125 watt infrared heat lamps were used to provide heat energy.

Preparation of the Thermochromic Laminate

The thermochromic laminate has two main parts; the thermochromic top layer and the reflective bottom layer. The thermochromic layer was created using Chromicolor Fast Black thermochromic ink manufactured by Matsui Shikiso Chemical Co. International, Inc. of Japan. The thermochromic ink was then mixed with a neutral Silk Screen Clear product also by Matsui that aids in adhering the thermochromic ink onto a plastic substrate. The two products were mixed at a ratio of 1:1 and then applied to a plastic film using the silk screen method. The silk screen method enables the thermochromic ink to be applied in a uniform thickness. The thermochromic layer was left to dry onto the plastic substrate. A second layer of thermochromic ink was then applied to the plastic substrate and allowed to dry, in order to increase the thickness/opacity of the thermochromic layer. The final thickness of the thermochromic layer is about 1 to 1.5 millimeters.

To create the reflective bottom layer, standard consumer-grade aluminum foil was used. Aluminum foil was selected in this case for the reflective layer since it is a good reflector and conductor of heat. In general, aluminum by itself is not normally recommended for roofing because of its very low emissivity (approx. 0.04), but in combination with the thermochromic material laminated to it, the emissivity is raised and thus becomes an acceptable selection. In addition, aluminum has other environmental and cost benefits.

The two layers were then snugly attached together to create the laminate. The laminate was then tightly attached to one of the roof models so that the reflective layer was laid flat and flush with the wooden rooftop. A cold lamination process is recommended in this case since a hot lamination process may damage the thermochromic layer. (Note: Other commercially available thermochromic inks were also tested such as Chromatic Technologies Inc.'s Dynacolor brand and Chemsong, Inc.'s Type B thermochromic ink. These thermochromic inks were deemed unsatisfactory for this application based on factors such as drying speed, consistency and opacity. It is also noted that thermochromic inks come in many different formulations and for different applications.)

Many other reflective materials can also be successively used. Examples of which are Aluminum, Copper, Brass, Galvanized steel, Gold, Silver, Metal Alloys, specialized plastic polymers. As long as they are 1) sufficiently reflective to radiant energy 2) have good heat conductivity and 3) a low Emissivity. Note: Emissivity of the reflective layer increases when the thermochromic layer is in color-developed mode.

In general, only metals have these three desirable properties. Also, interesting to note that a mirror, which is glass, is an excellent reflector of light but a poor reflector of infrared radiation. Mirrors have about the same reflectivity for infrared as a coating of black paint.

Lamination Process

In general there are two main methods for lamination. The first is hot lamination and the second is cold lamination. The concepts are mainly the same except for the fact that the hot lamination process binds the two sides of the film using heat-activated adhesives and the cold lamination process uses pressure-activated adhesives or UV-activated adhesives. Heat or Thermal Lamination is not recommended at this stage since the very high levels of heat used to bind the film may damage the thermochromic layer.

Temperature Logging

A 4-channel data logger (HOBO 4-channel External Data Logger by Onset Computer Corporation) was used to provide simultaneous real-time temperature data on a one minute interval rate. 3 temperature probes where used; one to measure the external ambient temperature, the remaining two measured the temperature inside the miniature roof models.

The temperature probe was placed inside and taped to the base of the model (see FIG. 5). There was also a temperature probe measuring the ambient temperature, as well as a second model consisting of shingles alone.

Testing Procedures

In all testing sessions, the two roof models where always measured simultaneously. The ambient temperature was measured by an uncovered external probe. All tests measured the base (Shingle covered model) versus the thermochromic laminate or other different structure coverings. Tests were also run separately on the different parts that made up the thermochromic laminate in order to prove that the Laminate was more efficient then the materials that make it up.

Most testing sessions were run for periods of 5–7 days where the models would be left outdoors in order to give the most accurate real-world results. Other short duration tests (2–5 hours in length) were also run indoors in order to test specific properties of the thermochromic laminate or its parts. A hypothetical daily temperature curve can be seen in FIG. 6.

FIG. 7 and Table 3 provide general summaries of the results to these experiments and demonstrate which properties of the laminate get activated during specific times of the day. In FIG. 7, segments 1 and 2 collectively represent the first half of the day and segments 3 and 4 collectively represent the second half of the day. In general, in the first half of the day, when the temperature is rising, the laminate absorbs heat through the color-developed thermochromic layer which is then passed on to the second reflective layer (In this case Aluminum Foil) through conductivity. The heat is then passed through to the structure again through conductivity. Although emissivity does play a role, it is a minor role in this segment.

TABLE 3

| Trigger Point | Rising Heat (Ex. 1st Half of the Day) | | Falling Heat (Ex. 2nd Half of the Day) | |
|---|---|---|---|---|
| | Below Trigger Point | Above Trigger Point | Above Trigger Point | Below Trigger Point |
| Reflectivity | | ✓ | ✓ | ✓ |
| Absorptivity | ✓ | | | ✓ |
| Emissivity | ✓ Minor | | | ✓ |
| Heat Conductivity | ✓ | | | ✓ |

In the second and third segments, Reflectivity is the property that plays the major role. When the thermochromic top layer passes its trigger zone, it moves to the color-extinguished mode. The reflective bottom layer is revealed thus enabling the reflective properties of the bottom layer.

In the fourth segment, the reflectivity of the bottom reflective layer is disabled as the thermochromic top layer moves into its color-developed mode. The emissivity rate of Aluminum foil and other metallic foils by themselves are not the most desirable, nevertheless, the laminate has the ability to increase the emissivity rate of the reflective layer to closely resemble the emissivity rate of the shingle.

FIG. 7 shows a presentative curve, which summarizes the data and clearly demonstrates the different properties of the thermochromic laminate.

The curve in FIG. 7 is broken down into 4 different segments. Each segment relates to different phases pertaining to the laminate. Segment 1 represents the measurement from the minimum point of that day's ambient temperature to the point at which the ambient temperature reached the thermochromic laminates trigger temperature wherein the thermochromic layer becomes transparent/translucent. Segment 2 represents the measurement from the point at which the ambient temperature reached the trigger zone to the maximum ambient temperature for that day. Segment 3 represents the measurement from the maximum ambient temperature to the point where the ambient temperature falls below the trigger zone, wherein the thermochromic layer becomes opaque. And lastly, Segment 4 represents the measurement from the point at which the ambient temperature intersected with the trigger point to the minimum temperature.

In segment 1, wherein the thermochromic laminate is in "Absorptive Mode," we notice that the shingles and the thermochromic laminate are gaining heat at a very similar rate. In fact, the shingles were increasing in heat only slightly faster (about 4%) then the thermochromic laminate. This shows that the absorptivity of the thermochromic laminate is very close to that of the shingles due to the process the laminate uses to absorb and transfer heat into the structure. Pure reflective roofs would be reflecting radiant energy at this point and would rejecting any potential solar gain.

In segment 2 and 3, wherein the thermochromic laminate is in "Reflective Mode," we notice that the shingle covered model continues to increase in heat while the thermochromic laminate covered model's rate of heat increase starts to fall. In Segment 2, the shingle covered model's internal heat is increasing at a rate 78% faster then the thermochromic laminate covered model. If we only look at the area over the trigger point in Segment 2 and 3, we can see that the thermochromic laminate model covers an average of 52% less then the shingle cover model. This shows that the thermochromic laminate is successfully functioning to reflect radiant energy away from the structure.

In segment 4, wherein the thermochromic laminate returns to Absorptive Mode, we notice that the normally low emissivity of the Aluminum has been raised to closely mimic that of the shingles. The shingle covered model is losing heat at a rate 5% faster then the thermochromic laminate. The thermochromic laminate continues to retain more heat throughout the night and averages about 0.5 Degrees warmer then the shingle model for a period of close to 12 hours.

Comfort Zone

We can define a temperature comfort zone as being between 75–85 degrees Fahrenheit, that is the temperature range where the structure would not need any internal cooling to remain in a comfortable range as seen in Table 4 and Table 5.

An analysis of FIG. 7 shows that the thermochromic laminate covered model remained in the comfort zone for a period of 216 minutes while the shingle covered model remained in the comfort zone for only 142 minutes. The thermochromic laminate remained in the comfort zone 52% longer then the shingles. In addition, the thermochromic laminate only averaged 2.1 Degrees Fahrenheit above the comfort zone for 203 minutes compared to 5.8 Degrees above the comfort zone for 299 minutes for the shingle.

TABLE 4

| 75–85 Degrees F. | Total Comfort Zone Time (minutes) |
|---|---|
| Thermochromic Laminate | 216 |
| Shingle | 142 |
| Difference | 74 |

The thermochromic laminate has 52% more comfort zone time than the ordinary shingle

TABLE 5

| Time Over 85 Degrees | Total Time Above Comfort Zone | Average Degree Above Comfort Zone | Difference (Avg. −85) | |
|---|---|---|---|---|
| Shingle | 299 | 90.82 | 5.8 | Above Comfort Zone for 299 Minutes |
| Thermochromic Laminate | 203 | 87.10 | 2.1 | Above Comfort Zone for 203 Minutes |
| Difference (Minutes) | 96 | | | |

In essence, the present thermochromic laminates give the equivalent of an On/Off switch to a roofing system or the like. It allows the structure to be either absorptive or reflective to radiant energy at desirable points in time. In contrast, other structure coverings do not have the capability to react dynamically to external temperature conditions. Either the coverings:

absorb radiant energy all the time (such as standard asphalt shingles), which then have a major disadvantage in warmer regions or when temperatures rise; or reflect all the time (such as reflective structure coverings), which then have a major disadvantage in the moderate/cooler regions or when temperatures fall.

Features of the present thermochromic laminate include:

Dynamic Absorptivity/Reflectivity

Dynamic Emissivity

Radiant Barrier

The present thermochromic laminates take advantage of solar gain when the ambient temperature is below a certain trigger zone (i.e., around 80 Degrees F.). The thermochromic laminate will absorb and transfer heat into the structure it is covering when desired.

The thermochromic laminate fights solar gain when the ambient temperature is above a certain trigger zone (i.e., around 80 Degrees F.). The thermochromic laminate will thus reflect radiant energy away from the structure it is covering when desired.

The present thermochromic laminates are reflective at higher temperatures and absorptive at lower temperatures. In addition, the laminates act as a radiant energy barrier either keeping radiant energy out, when the reflective layer is visible or reflecting radiant energy back into the home when the source of radiant energy is internal.

Aluminum is a very good reflective material but is not considered a good material for reflective roofing systems since it has very low emissivity. Emissivity is a parameter between 0 and 1 that measures the ability of a warm or hot material to shed some of its heat in the form of infrared radiation. What happens is that it gains some heat over time but takes a very long time to release the heat.

The most pertinent properties in the thermal performance of roofing is the total solar reflectance and the infrared emittance of the samples. Ideally, a roofing system designed to reduce cooling loads would have a very high solar reflectance (rejects solar radiation) with a very high infrared emittance (readily emits any collected heat).

There are a number of addition advantages of the present invention. The colors can be customized to match a specific color (i.e. owners of a brown brick home may choose to have dark brown thermochromic laminate tiles so as to match with the bricks. This may change the total effectiveness of the tiles since different colors have different rates of heat absorption. (Ex., a black tile will get hotter then a white tile).

Moreover, additional layers, films or laminates can be added to the top, bottom or in between the thermochromic laminate system. This may be useful for protection, insulation, fireproofing, UV protection, filtering, waterproofing, weatherproofing, underlayments and/or adhesive strips. These combinations may be utilized as long as they do not adversely effect the overall performance of the thermochromic laminate system. In some embodiments, the thermochromic laminate compositions of the invention can be molded or cut into any specific shapes or sizes such as three-tab shingles for roofs or integrated with vinyl siding.

Advantages of the present invention include a dynamic heating/cooling control system.

The present system is passive and automatically responds to predetermined temperature changes. For example, the present thermochromic laminates do not require the input of electrical energy in order to function. Thus, they can function during the failure of electrical power systems.

The present thermochromic laminates save energy by dynamically maximizing or minimizing the amount of heat absorbed by a structure. According to a study conducted by the Florida Solar Energy Center, a research institute of the University of Central Florida, (FSEC-PF-293-95), whitened (higher reflectivity) roofing systems averaged AC electrical savings of 19% up to a high of 43% during the summer, compared to roofs with traditional dark roof tiles. A thermochromic laminate system roof according to the present invention would achieve results just as good, if not better, and would be effective 24 hours a day, 365 days a year. Additional benefits could also be achieved if homes are fitted with thermochromic laminate system siding. According to the study, evidence suggests that a community with homes fitted with reflective roofs could serve to reduce the neighborhood ambient air temperature and reduce the magnitude of the urban heat island effect (in effect making your neighborhood feel cooler). Each 1° C. (1.8° F.) change in the urban air temperature has been shown to be associated with a 2–3% savings for the system-wide summer utility load in mid-latitude cities.

The present thermochromic laminates reduce power station emissions and pollution (such as $SO_2$, NOX and $CO_2$) by reducing the amount of energy needed to heat or cool a structure. Moreover, the present thermochromic laminates reduce the natural gas emissions and pollution by reducing the amount of energy needed to heat or cool a structure with conventional means such as natural gas or oil.

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

What is claimed is:

1. A thermochromic laminate comprising:

A) a base layer,
  said base layer having a structure contacting surface for communicating with an underlying structure, and a thermochromic contacting surface for communicating with a thermochromic layer,
  wherein said base layer is substantially reflective to electromagnetic radiation and substantially conductive to heat, and B) a thermochromic layer,
  said thermochromic layer having a base layer contacting surface for communicating with said base layer and an outer surface for communicating with said electromagnetic radiation
  wherein said thermochromic layer is of variable transmissivity to said electromagnetic radiation, and
  wherein the extent of said transmissivity is determined by the temperature of said thermochromic layer such that a change in said temperature results in a change in the transmissivity of said thermochromic layer and a change in the rate of heat transferred to, or reflected from, said underlying structure.

2. The laminate of claim 1, wherein said electromagnetic radiation is thermal radiation.

3. The laminate of claim 1, wherein an increase in said temperature of said thermochromic layer results in a color change corresponding to an increase in said transmissivity so that the amount of electromagnetic radiation reflected from said base layer through said thermochromic layer and away from said underlying structure is increased and the amount of heat available for absorption by said base layer is thereby decreased.

4. The laminate of claim 1, wherein a decrease in said temperature of said thermochromic layer results in a color change corresponding to decrease in said transmissivity so that the amount of electromagnetic radiation reflected from said base layer through said thermochromic layer and away from said underlying structure is decreased and the amount of heat available for absorption by said base layer is thereby increased.

5. The laminate of claim 3, wherein said increase in said transmissivity of said thermochromic laminate is reversible when said temperature decreases below a temperature trigger zone for said laminate.

6. The laminate of claim 3, wherein said increase in said transmissivity of said thermochromic laminate is accompanied by a change in the opacity of said thermochromic layer to said thermal radiation.

7. The laminate of claim 4, wherein said decrease in said transmissivity of said thermochromic laminate is reversible when said temperature increases above a temperature trigger zone for said laminate.

8. The laminate of claim 3, wherein said increase in said transmissivity of said thermochromic laminate is accompanied by a change in the color of said thermochromic layer.

9. The laminate of claim 1, wherein said bass layer comprises a metal having the ability to reflect sunlight and conduct heat.

10. The laminate of claim 1, wherein said base layer comprises a metallic coating having the ability to reflect sunlight and conduct heat.

11. The laminate of claim 7, wherein said metal is aluminum.

12. The laminate of claim 1, wherein said base layer comprises Mylar.

13. The laminate of claim 1, wherein said laminate is attached to an underlying structure, such as the roof of a habitable building.

14. The laminate of claim 1, wherein said electromagnetic radiation is sunlight from the sun.

15. The laminate of claim 1, wherein said electromagnetic radiation is from artificial sources.

16. The laminate of claim 1, wherein the emissivity of said base layer is matched to the specific environment in which the underlying structure exists.

17. The laminate of claim 5, wherein said trigger zone ranges from 19 to 25 degrees C.

18. The laminate of claim 5, wherein said trigger zone ranges from 20 to 24 degrees C.

19. The laminate of claim 5, wherein said trigger zone ranges from 21 to 23 degrees C.

20. The laminate of claim 5, wherein said trigger zone is less than one-half degree C. in range.

21. The laminate of claim 1, formed of materials that can be molded to fit the shapes of surfaces of said underlying structure.

22. The laminate of claim 1, wherein said thermochromic layer comprises at least one electron-donating phenolic compound.

23. The laminate of claim 1, wherein said electron-donating phenolic compound is enclosed in microcapsules.

24. The laminate of claim 1, wherein said thermochromic layer is provided in a color coordinated to the esthetic appearance of said underlying structure.

25. The laminate of claim 1, wherein said thermochromic layer is provided in a color that optimizes the amount of opacity or reflectivity desired in a given application of said laminate.

26. The laminate of claim 1, wherein said thermochromic laminate is provided in a form sufficiently malleable to conform to irregular surfaces.

27. The laminate of claim 1, wherein said thermochromic laminate is provided in a sheet like form sufficiently flexible to be wrapped around objects.

28. The laminate of claim 1, further comprising combined with one or more building enclosure material from the group consisting of thermoplastic, vinyl, aluminum, siding, sheathing, bricks, wood, copper, brass, nickel, cement, concrete, masonry, stone, plaster, gypsum, stucco, wall board, drywall, paints, polyethylene, building paper, felt, ABS, polycarbonate, polyurethane, polymers, styrofoam, acrylics, metals, steel, iron, rebar, wire mesh, netting, foils, fiberglass, asphalt, bitumen, ceramics, tiles, shingles, shakes and granules.

29. The laminate of claim 1, further comprising at least one additional layer C interposed between said layers A and B wherein, said layer C is selected from the group consisting of UV filters, solar cells, filters, process enhancers, sealers, fiberglass, mesh, netting, tints, enhancement films, performance films, specialty films, adhesive, adhesive strips and adhesive films.

30. The laminate of claim 1, further comprising at least one additional layer D, communicating with and interposed between said structure contacting surface and said structure, wherein said layer D is selected from the group consisting of adhesive, adhesive films, waterproofing, weatherproofing, underlayments, fireproofing, strengtheners, mesh, netting, fiberglass, wood, asphalt, ceramics, tiles, steel, aluminum, copper, metals, foils, asphalt, bitumen, granules and felt.

31. The laminate of claim 1, further comprising at least one additional layer E communicating with said outer surface of said thermochromic layer, wherein said layer E is selected from the group consisting of UV filters, algae preventers, mold preventers, fungus preventers, moss preventers, lichens preventers, bacteria preventers, fire proofing, specialty films, granules, weatherproofing and waterproofing.

32. The laminate of claim 1, comprising at least one surface of said structure.

33. The laminate of claim 32, wherein said surface comprises a roof of said structure.

34. The laminate of claim 32, wherein said surface comprises at least one wall of said structure.

35. A method for using thermochromic laminates to regulate the thermal energy absorption or reflection of a structure to thereby control its temperature comprising providing, in close communication with an underlying structure or object, a thermochromic laminate comprising:

A) a base layer,
   said base layer having a structure contacting surface for communicating with an underlying structure, and a thermochromic contacting surface for communicating with a thermochromic layer,
   wherein said base layer is substantially reflective to electromagnetic radiation and substantially conductive to heat, and B) a thermochromic layer,
   said thermochromic layer having a base layer contacting surface for communicating with said base layer and an outer surface for communicating with said electromagnetic radiation, wherein said thermochromic layer is of variable transmissivity to said electromagnetic radiation, and wherein the extent of said transmissivity is determined by the temperature of said thermochromic layer such that a change in said temperature results in a change in the transmissivity of said thermochromic layer and a change in the rate of heat transferred to, or reflected from, said underlying structure.

36. The method of claim 35 wherein said thermochromic laminate is one that predictably effects color changes in response to changes in temperature.

* * * * *